April 9, 1935. F. H. LAMB 1,997,000
DUMP BODY TRACTOR
Filed Feb. 5, 1932 4 Sheets-Sheet 1
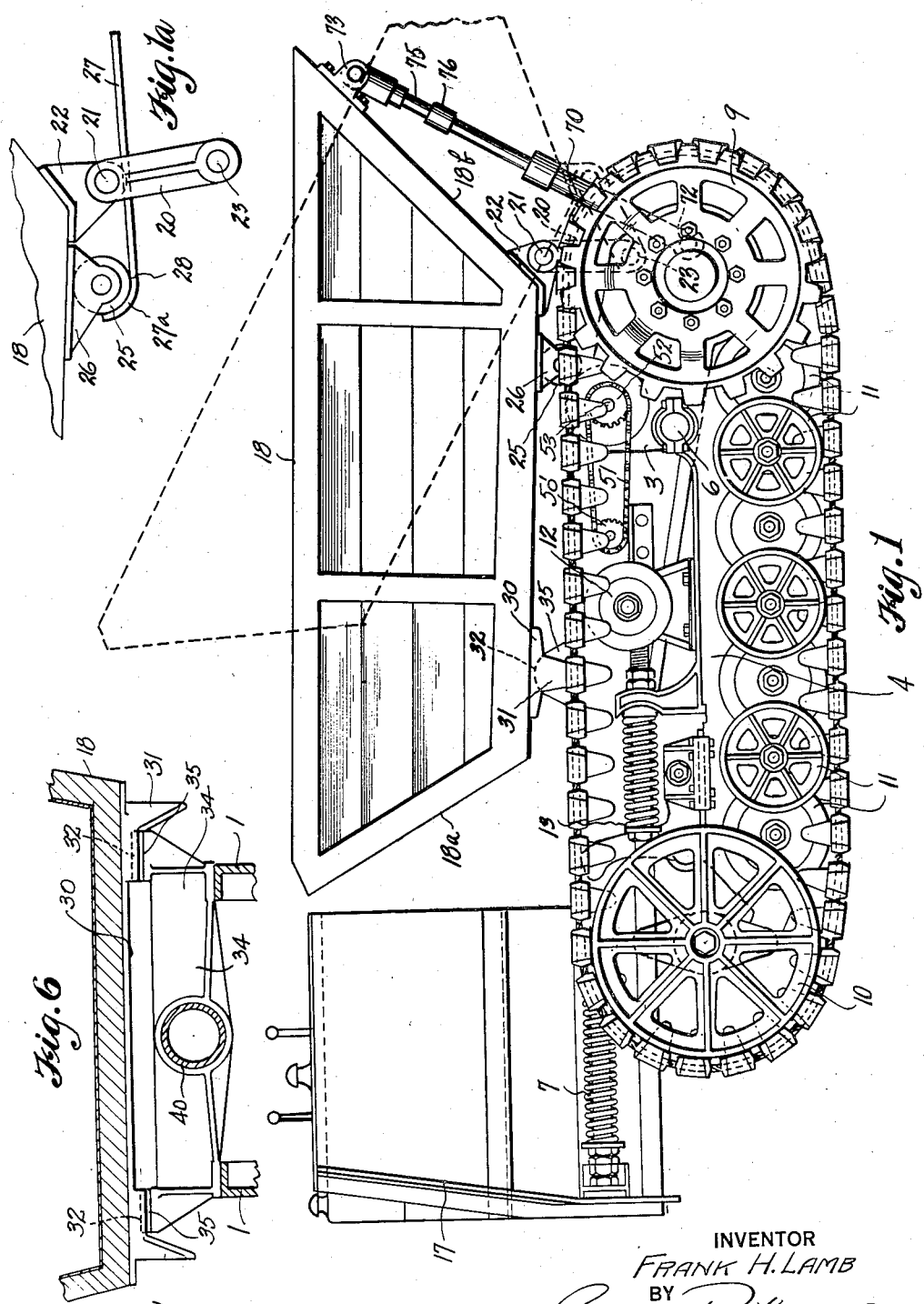
INVENTOR
FRANK H. LAMB
BY
Cook & Robinson
ATTORNEYS

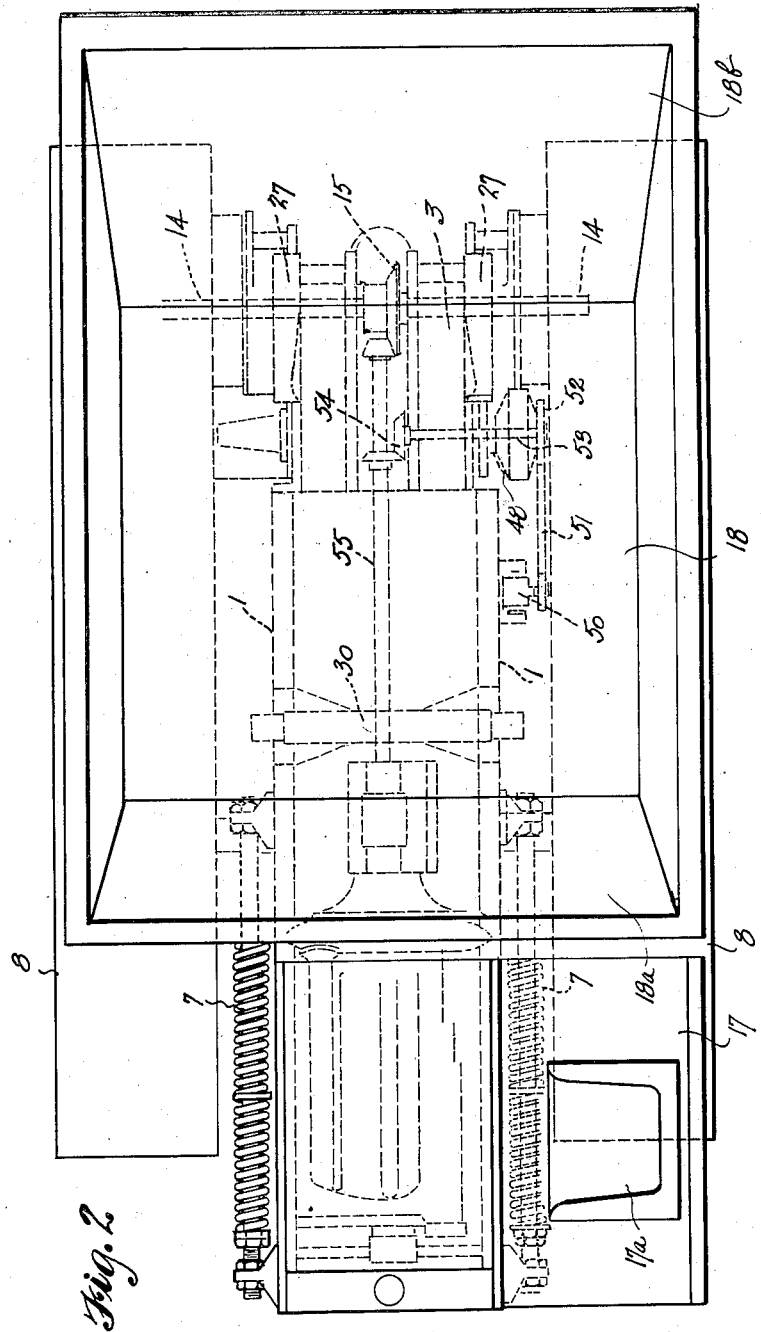

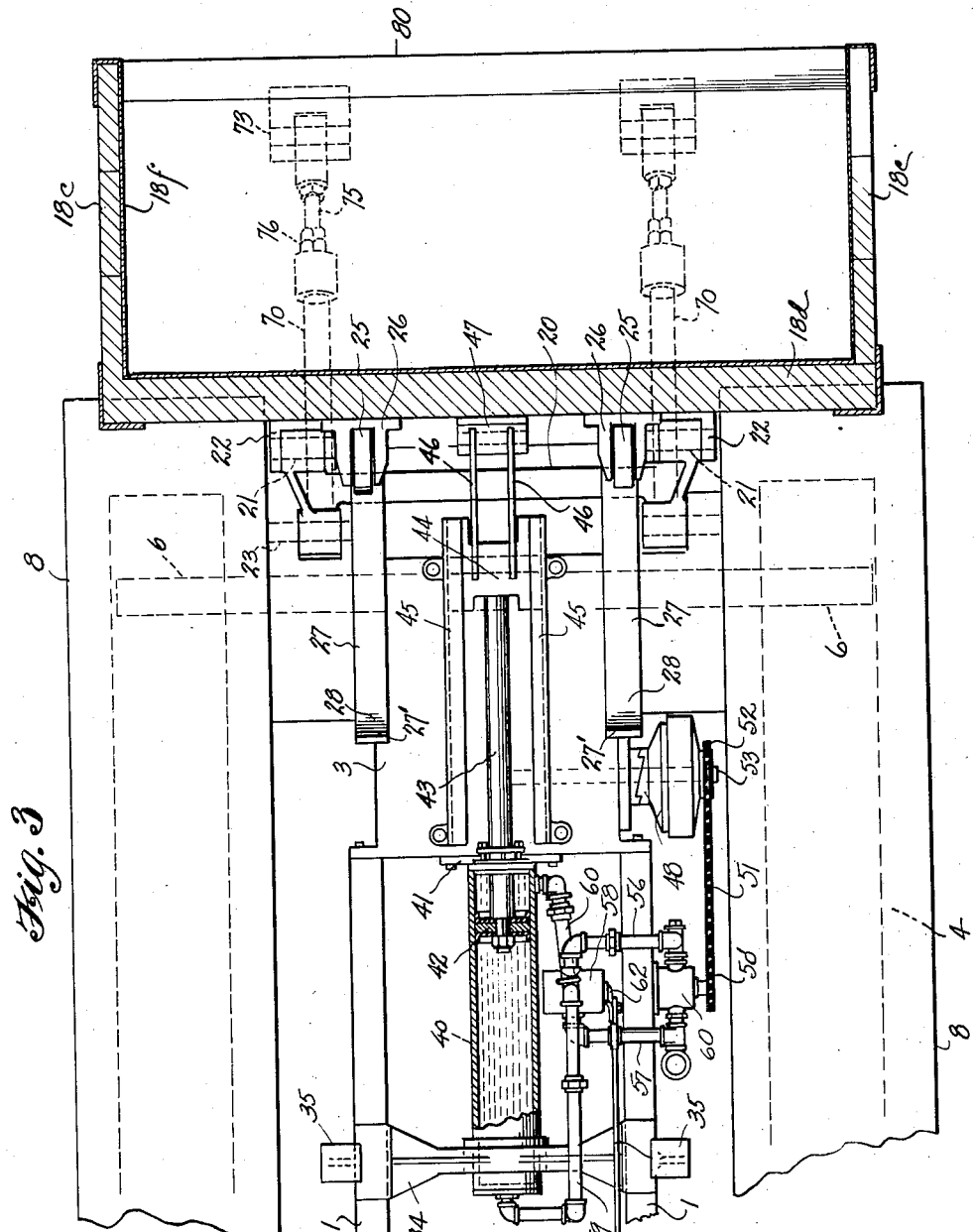

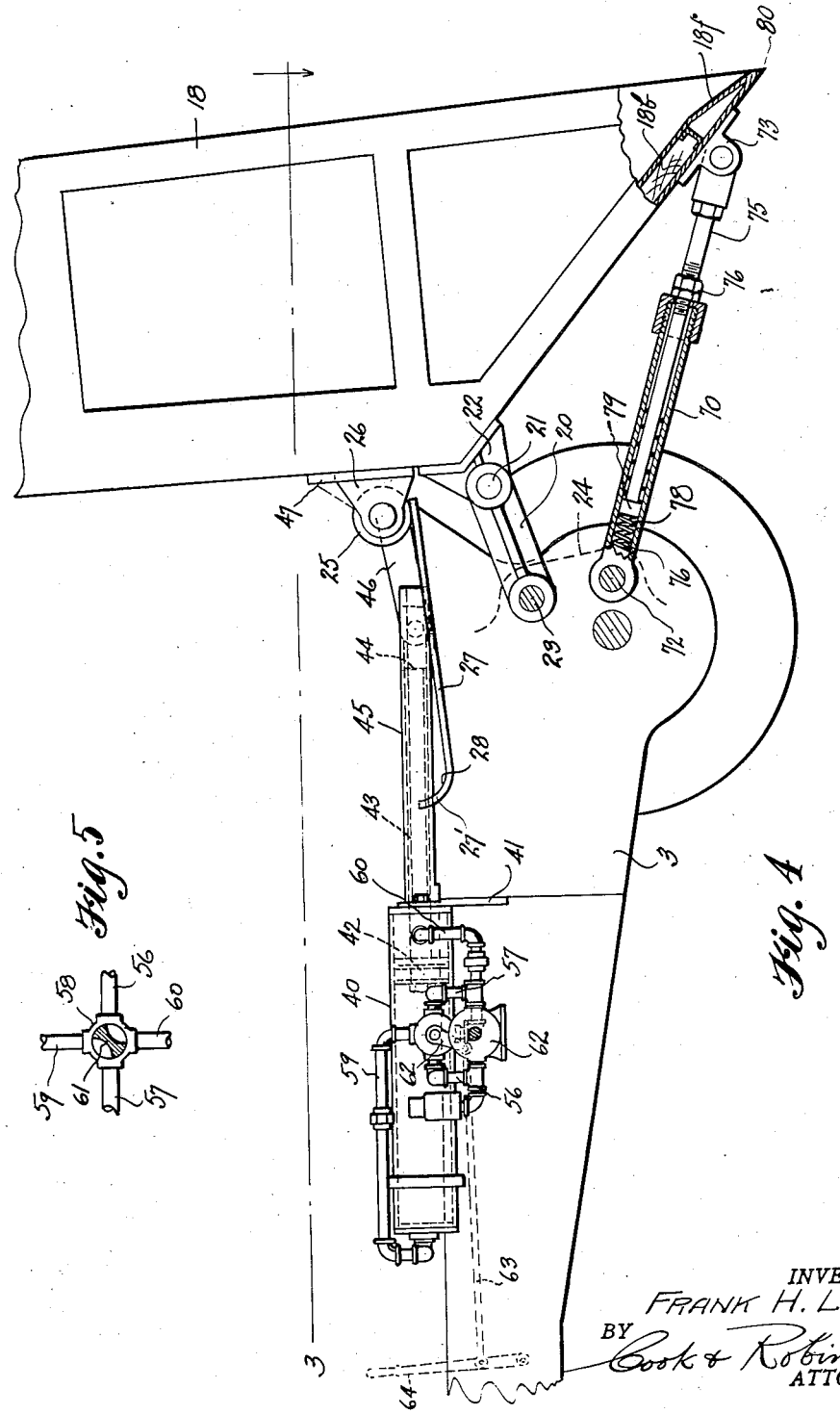

Patented Apr. 9, 1935

1,997,000

UNITED STATES PATENT OFFICE 1,997,000

DUMP BODY TRACTOR

Frank H. Lamb, Hoquiam, Wash.

Application February 5, 1932, Serial No. 591,072

5 Claims. (Cl. 298—22)

This invention relates to improvements in tractors and it has reference in particular to dump body tractors; it being the principal object of the present invention to provide a fast moving and easily controlled load carrying tractor of the track laying type, and equipped with a body mounted for end dumping and with hydraulic mechanism operable by the tractor engine to effect a positively controlled movement of the body between dumping and load carrying positions.

It is also an object of the invention to provide body mounting means of novel construction, providing for the rocking of the body rearwardly on a swinging hinge support during a dumping operation, thereby to effect dumping without causing any material lifting of the load and also eliminating uncertain gravity action and its detrimental effect. Furthermore, the provision of a construction which incidentally reduces the power required for dumping and, at the same time, speeds up the dumping action.

Another object of the invention is to provide body dumping mechanism whereby the body may be held positively at any adjusted position and to so construct the body that, when secured in dumping position, the rear end wall thereof may be used as a blade for grading and leveling operations. Furthermore, when so used, the swinging hinge support for the body provides for a certain vertical adjustment of the blade that is especially desirable in leveling off or carrying on what is commonly known as "bulldozing".

It is a further object of the present invention to provide a tractor of the above stated character that is operable at the same different speeds in either direction, and to provide an operator's station adjacent one side of the engine and well to one side of the main frame from which the operator may have an unobstructed view of the roadway and work being done while operating in either direction, without requiring that he change position in the seat.

Other objects of the invention reside in the details of construction of the various parts, in their combination and mode of operation, as will hereinafter be fully described.

In accomplishing these and other objects of the invention, I have provided the improved details of construction, the preferred forms of which are illustrated in the accompanying drawings, wherein—

Figure 1 is a side elevation of a load carrying tractor with dump body and control mechanism as embodied by the present invention.

Figure 1a is a detail showing the body mounting hinge and relative positions when the body is lowered.

Figure 2 is a plan view of the tractor, parts of the transmission gearing being indicated in dotted lines, and parts being omitted for better illustration.

Figure 3 is a plan view of a part of the tractor, particularly illustrating the body dumping mechanism; this view being taken substantially on the line 3—3 in Figure 4 when the body is in dumped position.

Figure 4 is a side elevation of the parts as shown in Figure 3.

Figure 5 is a cross sectional detail of the control valve for the hydraulic cylinder.

Figure 6 is a cross section view illustrating the cross supports for the forward end of the dump body and their relation when the body is lowered.

Briefly described, the present invention embodies a dump tractor of the track laying type. The tracks are of continuous belt form and are of substantial width and the track carrying frames on which they operate are pivotally mounted at opposite sides of the main tractor frame in a manner to permit of the necessary flexibility for satisfactory operation of the tractor over uneven ground. The engine for driving the tractor and from which the dumping mechanism is operated, is mounted at what will be termed the forward end of the main tractor frame, leaving the remaining part clear for the mounting thereon of the dump body. The body dumping mechanism is located within the frame and directly beneath the body and it includes a hydraulic cylinder with a pump connected thereto which is operated, under control of a manually set clutch connection, from the vehicle's engine. The various controls for the engine and those for the speed transmission and also those for the dumping mechanism are preferably located adjacent the operator's station, which, as stated in the objects of the invention, is located at one side of the engine and well over one side of the frame, in order to give the operator a clear view of the roadway and work being done with the tractor moving in either a forward or rearward direction. The dump body is actuated by movement of the piston of the hydraulic cylinder and it pivots about a swinging hinge in a novel manner, as will later be fully described.

Referring more in detail to the drawings—

The main frame structure of the tractor includes the opposite longitudinal side beams 1—1 with suitable cross connections, rigidly joining them. The side beams are rigidly secured at their rearward ends to a closed housing 3 within which the change speed and power transmission gearing and control devices, not illustrated in detail, are located. The mounting frames 4—4 for the track belts are located at opposite sides of the main frame, lengthwise thereof and have ends pivotally mounted on the opposite ends of a substantial shaft 6 which extends transversely through the housing 3 as a support for the rear end of the tractor. At their forward ends, the track frames support the main frame through the medium of spring suspensions of a suitable form, as designated at 7, which permit the necessary movement vertically of the track frames with respect to each other and to the main frame, thus to accommodate the tracks for travel on uneven surfaces without unusual strain on the various mountings or frames. The track belts 8 are mounted for travel about the frames 4—4 on wheels 9 and 10; the wheels 9 being the track driving wheels. Between the wheels 9 and 10, which are mounted at opposite ends of the frames, the lower runs of the track belts are guided by and operate against a plurality of idler wheels 11 and the upper runs of the tracks are supported by idler wheels 12. A spring adjusted belt tightener, as at 13, is associated with each track to automatically take up slack that is incident to any elongation of the track belts.

A detailed description of the track construction is not included in the present application since it will be the subject matter of a separate patent application.

The drive wheels 9 for the two track belts are mounted at the outer ends of the differential axles 14—14 which are driven by differential gearing, designated at 15, operated through the transmission mechanism in the housing 3, by a drive shaft extended from the vehicle's engine, in the usual manner. The transmission mechanism, while not shown in detail, preferably provides for operation of the vehicle at various speeds in like manner in either direction and the guiding and turning of the vehicle is accomplished by driving the tracks at the same or at different speeds.

In order that the operator of the tractor may have a clear view of the work being done and the roadway when operating the tractor in either direction, an operator's platform 17 is supported from the main frame at one side of the engine. This platform is located well over one side of the frame and the operator at this station has easy access to the various controls for the tractor and the dumping mechanism. The driver's seat 17a on this platform is placed facing the engine so that the driver need only turn his head sideways to see either forwardly or rearwardly of the tractor. No turning in the seat is necessary.

The principal objects of the present invention, however, reside in the dump body construction, its mounting and in the dumping mechanism. As seen best in Figure 4, the dump body 18 is of box-like construction with sloping front and rear end walls 18a and 18b and with opposite side walls 18c and bottom wall 18d; all of which are lined with sheet metal, as at 18f. The upward swinging end of the body is supported from the main frame approximately medially of the ends of the frame and the rear end of the body is attached by a special hinge to the rear end portion of the transmission housing 3; the means of making the hinged connection comprises a hinge leaf 20 which extends transversely of the body and at its outer edge has pivotal connections, as at 21, with brackets 22 that are fixed to the rear end portion of the body, and at the ends of its lower edge, the hinge has pivotal connections, as at 23, with flanges 24 that are fixed to or cast as a part of the housing 3.

A pair of body lifting rollers 25—25 are mounted by supports 26 fixed to the underside of the body, forwardly of the brackets 22. These rollers are mounted for travel upon tracks 27—27 that are cast on or fastened to the transmission housing 3. These tracks slope upwardly, in like degree, from their forward ends toward their rearward ends, as seen in Figures 1a and 4, and at their forward ends are formed with upwardly curved ends 27a providing seats 28 within which the rollers 25 rest when the body is in a lowered position, as seen in Figure 1a.

At its forward, or swinging end, the body has a transverse bar 30 securely fastened to its under wall and this is provided at its ends with downwardly extending guide lugs 31 and just within these lugs the bar has seats 32 formed therein. This bar 30 is adapted to cooperate with a transverse bar 34 fixed between the opposite side beams of the main frame, as a support for the forward end of the body. The bar 34 has bosses 35 at its ends which engage within the seats 32 when the body is lowered and guide lugs 31 engage with these bosses to prevent lateral movement of this end of the body especially when loaded.

Movement of the body between its load carrying and dumping positions is effected by a dumping mechanism comprising a hydraulic cylinder 40 that is mounted lengthwise of the main frame below the body; the cylinder being supported at its forward end within the cross bar 34 and at its other end by a bracket 41 that is rigidly attached to the forward end of the transmission housing 3. Within the cylinder is a piston 42 having a rod 43 extended rearwardly therefrom through the rear end of the cylinder. The outer end of the piston rod connects with a cross head 44 slidable in guides 45—45 that are fixed upon the top of the transmission housing. A pair of links 46—46 pivotally connect the cross head with a bracket 47 fastened to the under side of the body substantially in alinement with the rollers 25.

A liquid pressure medium fills the cylinder 40 and a pump 50 is employed to pump this medium from one end of the cylinder into the other to move the piston inwardly or outwardly for the purpose of lowering or dumping the body. The pump may be any suitable type and is driven by a sprocket chain belt 51 operating about a sprocket wheel 50' on the pump shaft and a sprocket 52 on a cross shaft 53 which has a driving connection, as indicated at 54 in Figure 2, with the engine shaft 55. A clutch 48 is manually adjustable to control the action of the pump and this clutch is shifted by any suitable means which would include a lever 48' adjacent the driver's position. Opposite sides of the pump are connected by pipes 56 and 57 with opposite sides of a valve housing 58 which also has pipe connection 59 and 60 with opposite ends of the cylinder and a valve member 61 is rotatably adjustable in the housing to different positions to control the direction of flow of the liquid to the cylinder. The valve member 61 is connected by a lever arm 62 and rod 63 with a hand lever 64 adjacent the operator's position.

Telescopic struts or braces are pivotally connected to the rear end of the transmission housing as at 72 and to brackets 73 fixed to the rear end wall of the body to brace the body when it has reached its limit of movement toward dumping position. These struts comprise tubular outer sections 70 and rods 75 that telescope therein. Nuts 76 are adjusted on the rods to limit their telescopic movement inwardly. Also, springs as at 78 may be included within the tubular sections about the rods 75 to act against nuts 79 on the latter to cushion the movement of the body.

With the machine so constructed, and with the body in position, as in Figure 1, and assuming that it has been loaded and that it is desired to dump the load, the operator throws the pump into gear with the valve set to pump liquid from the rearward end of the cylinder 40 into the forward end. This causes the piston 42 to be moved rearwardly, and through the rod 43 and links 46 to shift the body rearwardly. As the body moves rearwardly the hinge link connection 20 causes the rear end of the body to be swung downwardly while at the same time the rollers 25 moving rearwardly and up the inclined tracks 27, through the forward end of the body upwardly through the dotted line position of Figure 1 and finally to position of Figure 4. Thus, it will be observed that there is practically no upward lift of the center of gravity of the load during this dumping operation and therefore the power required for dumping is reduced to a minimum. When the body reaches the position of Figure 4, its movement is stopped by the co-action of hinge link 20 and by the limited telescoping action of the struts 70; this being the result of nuts 76 engaging the end of tubes 70.

After a load has been dumped, with the body still in dumping position, it can be used for leveling off, serving in this way as a grader blade. Vertical adjustment of this blade is made by a controlled movement of the body toward loading position effected by the hydraulic mechanism. It will be observed by reference to Figure 4, that the top edge of the rear end wall of the body is sharpened as at 80 for grading and bulldozing purposes.

When it is desired to lower the dump body, the valve member 61 is reversed and the action of the pump then causes the piston to be adjusted inwardly. This swings the body forwardly and permits its forward end to be lowered onto the supporting bar 34. Thus, both in lowering and raising the body, the movement is positive and at all times under control of the hydraulic cylinder.

Having thus described my invention, what I claim as new therein and desire to secure by Letters-Patent is—

1. In a dumping vehicle, a frame, a dump body mounted thereby, a pair of tracks fixed relative to the frame and extended in an upwardly inclined direction rearwardly thereof, a transversely disposed swinging hinge link connecting the body at its dumping end with the rear end of the frame, supporting rollers on the body resting on said tracks and movable therealong, body dumping mechanism including means for shifting the body rearwardly during a dumping operation whereby downward swinging of the hinge and travel of said rollers upwardly on the tracks causes the body to be tilted to dumping position, and struts fixed to the body and to the frame for limiting the extent of movement of the body toward dumping position.

2. In a dumping vehicle, a frame structure including parallel tracks extended lengthwise thereof in an upwardly inclined direction, a dump body resting at its forward end on said frame, an upright swinging hinge link connecting the rearward end of the body with the frame below said tracks, roller fixed to the body and resting on said tracks for movement therealong and a body dumping mechanism including guideways longitudinally of the frame, a cross head slidable therein, a link connecting the cross head and dump body, and means for moving the cross head forwardly or rearwardly whereby the body will be shifted accordingly to effect its movement between dumping or load carrying positions.

3. In a dumping vehicle, a frame structure including parallel tracks extended lengthwise of the frame in an upwardly inclined direction, a dump body resting at its forward end on said frame, an upright swinging hinge link connecting the rearward end of the body with the frame below said tracks, rollers mounted on the body and resting on said tracks for movement therealong and a body dumping mechanism including a hydraulic cylinder, a piston operable therein, a longitudinal guideway on the frame, a cross head slidable in the guideway and operatively connected with said piston, a link connecting the cross head and body and means for controlling application of a pressure medium to the cylinder to effect movement of the piston in opposite directions for moving the body between load carrying and dumping positions.

4. A device as set forth in claim 2 wherein, telescopic struts are connected to the body and to the frame for limiting the movement of the body toward dumping position, and wherein seats are provided at the lower ends of said tracks to seat said rolls to limit the forward movement of the body.

5. A dump tractor comprising a frame structure including parallel, upwardly inclined tracks extending rearwardly thereof, a dump body, an upright swinging hinge link connecting the rearward end of the body with the frame below said tracks, a pair of rollers on the body resting on and movable along said tracks, a pair of telescopic struts attached to the frame and to the end wall of the body to limit its dumping movement, a cross beam in the frame for supporting the forward end of the body, said beam having upstanding lugs at its ends, and plates fixed to the body and formed with seats to receive said lugs and with guide flanges to engage the lugs to properly seat them.

FRANK H. LAMB.